United States Patent
Yeung et al.

(10) Patent No.: US 12,360,899 B2
(45) Date of Patent: Jul. 15, 2025

(54) SCOREBOARD FOR REGISTER DATA CACHE

(71) Applicant: Apple Inc., Cupertino, CA (US)

(72) Inventors: Winnie W. Yeung, San Jose, CA (US);
Zelin Zhang, San Jose, CA (US);
Cheng Li, Sunnyvale, CA (US);
Hungse Cha, Campbell, CA (US);
Leela Kishore Kothamasu, Fremont, CA (US)

(73) Assignee: Apple Inc., Cupertino, CA (US)

( * ) Notice: Subject to any disclaimer, the term of this patent is extended or adjusted under 35 U.S.C. 154(b) by 38 days.

(21) Appl. No.: 18/410,413

(22) Filed: Jan. 11, 2024

(65) Prior Publication Data
US 2025/0103493 A1    Mar. 27, 2025

Related U.S. Application Data

(60) Provisional application No. 63/585,265, filed on Sep. 26, 2023.

(51) Int. Cl.
*G06F 12/0811* (2016.01)
*G06F 12/12* (2016.01)
*G06F 12/126* (2016.01)

(52) U.S. Cl.
CPC .......... *G06F 12/0811* (2013.01); *G06F 12/12* (2013.01); *G06F 12/126* (2013.01)

(58) Field of Classification Search
CPC ..... G06F 12/0811; G06F 12/12; G06F 12/126

USPC ......................................................... 711/122
See application file for complete search history.

(56) References Cited

U.S. PATENT DOCUMENTS

| | | | |
|---|---|---|---|
| 10,198,267 B2* | 2/2019 | Airaud | G06F 9/3838 |
| 2021/0117201 A1 | 4/2021 | Gray | |
| 2021/0311743 A1 | 10/2021 | Tran | |
| 2023/0078414 A1 | 3/2023 | Olorode et al. | |
| 2023/0350680 A1* | 11/2023 | Tran | G06F 9/3838 |
| 2024/0289282 A1* | 8/2024 | Redshaw | G06F 12/0857 |

* cited by examiner

*Primary Examiner* — Hashem Farrokh
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to graphics processor data caches. In some embodiments, datapath executes instructions that operate on input operands from architectural registers. Data cache circuitry caches architectural register data for the datapath circuitry. Scoreboard circuitry tracks, for a given architectural register: map information that indicates whether the architectural register is mapped to an entry of the data cache circuitry and a pointer to the entry of the data cache circuitry. Tiered scoreboard circuitry and data storage circuitry may be implemented (e.g., to provide fast scoreboard access for active threads and to give a landing spot for long-latency data retrieval operations). Various disclosed techniques may improve cache performance, reduce power consumption, reduce area, or some combination thereof.

20 Claims, 12 Drawing Sheets

SCOREBOARD FOR REGISTER DATA CACHE

The present application claims priority to U.S. Provisional App. No. 63/585,265, entitled "Scoreboard for Register Data Cache," filed Sep. 26, 2023, the disclosure of which is incorporated by reference herein in its entirety.

BACKGROUND

Technical Field

This disclosure relates generally to graphics processors and more particularly to cache circuitry for operand data.

Description of Related Art

Graphics processors typically define architectural registers that may be used to store operands for various instructions. Graphics processors also typically support parallel execution, e.g., using single-instruction multiple-data (SIMD) datapath circuitry. Therefore, a given architectural register may be defined for each thread in a SIMD group of threads.

In unified memory architectures, architectural register data may be memory backed. Therefore, architectural register data may be stored in a low-level cache, for example, in contrast to a traditional register file. Traditional cache architectures (e.g., with tag checks) may have drawbacks in this context, however.

DETAILED DESCRIPTION

In disclosed embodiments, a low-level graphics processor data cache (e.g., a level 0 data cache (DL0)) stores architectural register data and the graphics processor uses scoreboard circuitry to track mappings of architectural registers to data cache entries. For example, the scoreboard may track, for each general-purpose register (GPR) of each active thread, whether the GPR is mapped in the data cache and, if so, store a pointer to the data cache entry. This may replace a traditional tag array for determining cache hits and misses.

The scoreboard may also track long-latency operations, pending evictions, locks (which may prevent eviction), initialization state, etc., as discussed in detail below. Further, the scoreboard may include separate structures for active threads and inactive threads (e.g., a flop structure for active threads and a random-access memory (RAM) for inactive threads), which may advantageously keep information for inactive threads available in an energy-efficient and area-efficient manner without reducing performance for active threads.

The scoreboard may also include eviction candidate circuitry configured to store scoreboard information for deactivated threads, e.g., for quick eviction in conjunction with various cache management operations (e.g., to avoid reaching an overall cache occupancy threshold).

Further, in some moments, the actual cache data storage circuitry is designed to keep area and power low, while still providing desired cache access performance. For example, the data cache may be implemented using a tiered multi-level RAM with one smaller level accessible to the datapath and also able to fill from the larger level. In these embodiments, the scoreboard may track register mapping for both RAM levels (e.g., a single scoreboard lookup for a given register may identify the corresponding cache entry in either level). Control circuitry may allocate into either level (e.g., allocating into the larger level when waiting for a long-latency operation). This may advantageously provide a landing spot and immediate allocation for long-latency operations (instead of waiting to allocate until the data is ready, which may add latency), while still providing performance for shorter-latency operations via the smaller RAM level.

Graphics Processing Overview

Figure 1A:
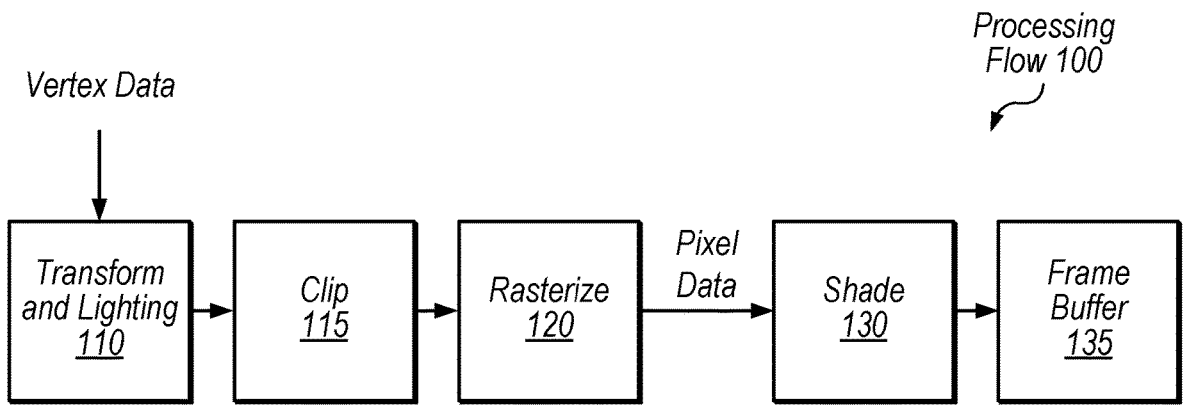
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
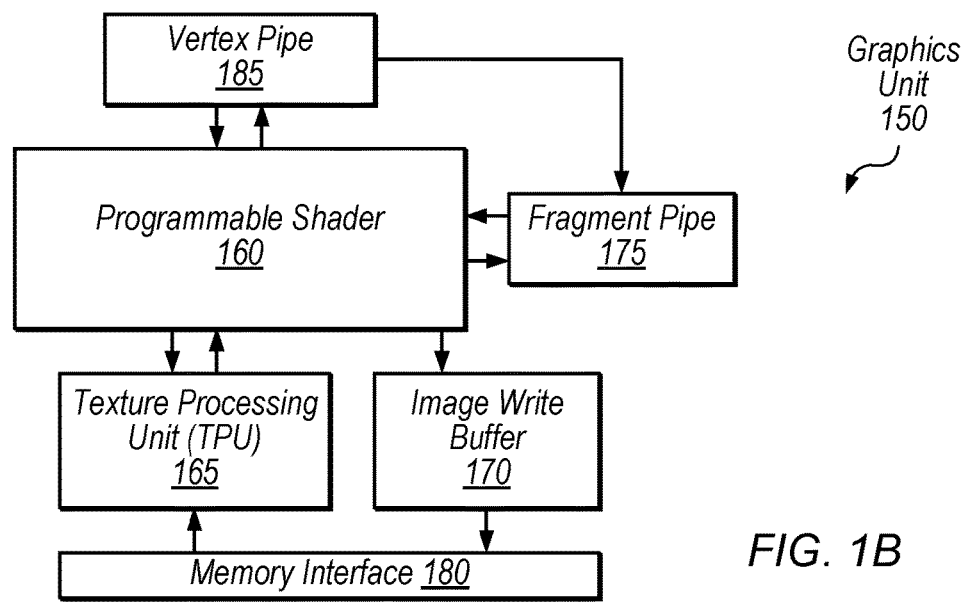
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Data Cache with Scoreboard Circuitry

Figures 2, 3:
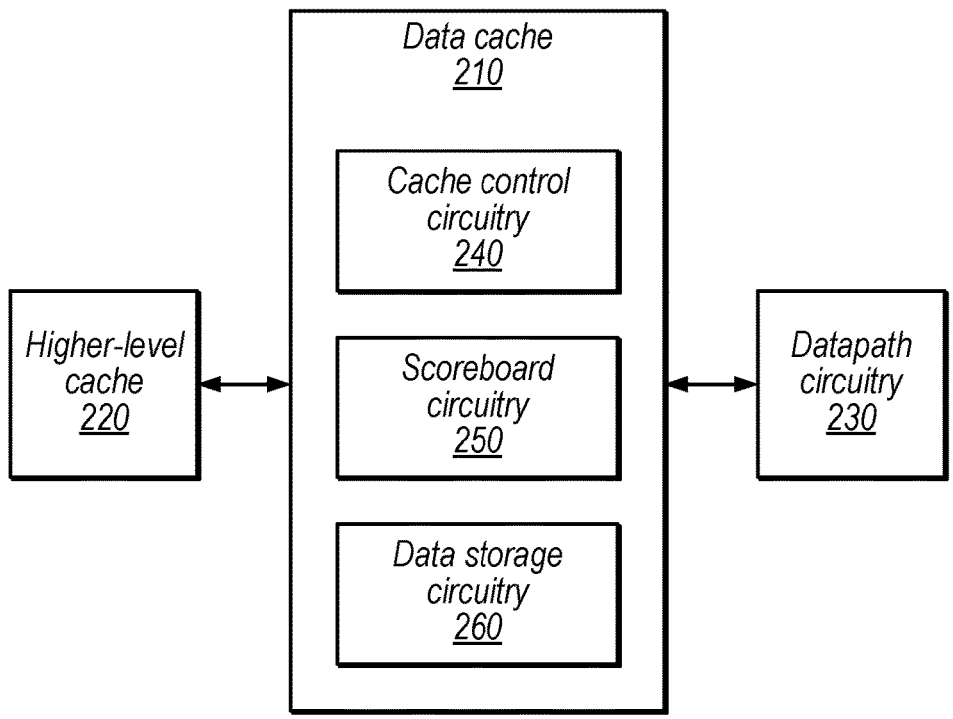
FIG. 2 is a block diagram illustrating an example data cache that includes scoreboard circuitry, according to some embodiments.
FIG. 3 is a diagram illustrating example fields of a scoreboard entry, according to some embodiments.

FIG. 2 is a block diagram illustrating an example data cache that includes scoreboard circuitry, according to some embodiments. In the illustrated example, the system (e.g., programmable shader 160) includes data cache 210, higher-level cache 220, and datapath circuitry 230.

Datapath circuitry 230, in some embodiments, includes processing pipelines configured to execute instructions. In some embodiments, datapath circuitry 230 includes single-instruction multiple-data (SIMD) pipelines, as discussed below with reference to FIG. 5. Datapath circuitry 230 may include decode circuitry, scheduler circuitry, hazard check circuitry, dispatch circuitry, execution circuitry, etc. Execution units of datapath circuitry 230 (e.g., integer ALUs, floating-point ALUs, load-store units, etc.) may be configured to operate on register data stored in datapath circuitry 230 (or use register data for other purposes, e.g., to determine the location of other data to be operated on).

Higher-level cache 220, in the illustrated embodiment, is configured to cache data at a higher level (further from the datapath circuitry) than data cache 210. The illustrated caches may be included in a cache/memory hierarchy. Cache 210 may evict data to cache 220 and fill requested data from cache 220, for example. Cache 220 may be configured to cache more types of data than cache 210 (e.g., may also cache non-register data) and may be shared by a greater number of client circuits.

Data cache 210, in some embodiments, is dedicated to caching register data (e.g., for architectural registers, which may include general-purpose registers). In the illustrated example, data cache 210 includes cache control circuitry 240, scoreboard circuitry 250, and data storage circuitry 260. In unified memory embodiments, registers may be memory-backed and therefore may be mapped within an address space. Therefore, register data may be evicted to higher-level cache 220 in some scenarios.

Cache control circuitry 240, in some embodiments, is configured to access and manage the scoreboard circuitry 250 and access data storage circuitry 260 based on information in scoreboard circuitry 250. Detailed examples of control circuitry are discussed below with reference to FIG. 7, for example. Cache control circuitry may receive requests, determine hits and misses, initiate data fills in response to misses, respond to requests, perform cache maintenance operations, etc.

Data storage circuitry 260, in some embodiments, is configured to store cached data, e.g., register data. Data storage circuitry 260 may include one or more RAMs, for example. Detailed example tiered embodiments of circuitry 260 are discussed in detail below with reference to FIG. 8.

Scoreboard circuitry 250, in some embodiments, is configured to determine hits and misses for cache 210. For example, an access request to data cache 210 from datapath circuitry 230 may include a SIMD group identifier and a register identifier. Data cache 210 may not include traditional tag circuitry but may access scoreboard circuitry using the SIMD group identifier and register identifier. Scoreboard circuitry 230 may determine whether the identified register is mapped in data cache 210 for the identified SIMD group. If so, cache control circuitry may access the register data in data storage circuitry 260 (e.g., using a pointer to the entry in data storage circuitry 260 maintained by scoreboard circuitry 250). FIG. 3, discussed in detail below, provides additional example information that scoreboard circuitry 250 may maintain for a given entry. Data cache 210 may provide a map check interface for each instruction or micro-operation being processed in datapath circuitry 230 to allow instructions/operations to check whether their operands are cached (e.g., for purposes of issuing instructions once their operands are ready).

Note that data cache 210 and datapath circuitry 230 may be replicated multiple times in a given shader core or graphics processor. In some embodiments, the datapath circuitry 230 corresponding to a given data cache supports a maximum number of active threads or active SIMD groups. In some embodiments, scoreboard circuitry 250 includes sufficient entries for all of a set of registers (e.g., all architecturally-defined GPRs and coefficients) for this number of active threads. As discussed in detail below, scoreboard circuitry 250 may also maintain entries for non-active (e.g., deactivated) threads, which may reduce latency when those threads become active.

Note that in other embodiments, there may be one or more lower-level storage circuits between data cache 210 and datapath circuitry 230 (e.g., an operand cache). Generally, however, disclosed techniques may be particularly advantageous for caches that are closer to the datapath circuitry. Similarly, higher-level cache 220 may be omitted, in some embodiments, and data cache 210 may fetch from, and store data to, a memory circuit (although typically there are multiple cache levels between a low-level cache and a system memory, for example).

FIG. 3 is a diagram illustrating example fields of a scoreboard entry, according to some embodiments. In the illustrated example, an entry of scoreboard circuitry 250 includes map state 310, initialized field 320, pointer 330 to a storage entry, long-latency operation pending field 340, line-fill data return pending field 350, evict pending field 360, and locked field 370.

As discussed above, an entry in scoreboard circuitry 250 may be identified based on a thread identifier (e.g., a SIMD group identifier) and a register identifier. Scoreboard circuitry 250 may use a content-addressable memory, a lookup table, or an indexing scheme, for example, to map the thread and register identifiers to an entry in the scoreboard. Generally, the scoreboard may include a region for a given thread or SIMD group and the register identifier may be used as an offset into that region of the scoreboard.

Map state 310 indicates whether a SIMD group register is mapped in an entry in data storage circuitry 260. If a requested register is not mapped, control circuitry 240 may allocate an entry (and if the register is currently in a higher-level cache, may initiate a fill operation to retrieve data from cache 220 and set line-fill data return pending field 350 to indicate that the fill is pending). If a requested register is mapped, scoreboard circuitry 250 may return the pointer to the entry identified in field 330. Pointer field 330 may store an SRAM address of a cache line in data storage circuitry 260, for example.

Initialized field 320 indicates whether the location indicated by the pointer includes valid data. Note that an entry in data storage circuitry 260 may be allocated for a register, indicated as mapped by map state 310, and pointed to by field 330, but still not have valid data yet (e.g., while waiting for a long-latency operation, line-fill, or datapath write). Therefore, initialized field 320 may allow tracking of when the data is valid.

Long-latency operation pending field 340 indicates whether the register has a corresponding long latency data return. This may correspond to a load from device memory, for example. Control circuitry 240 may clear field 340 when the long-latency operation has been scheduled to write into data storage circuitry 260, for example. This may advantageously allocate a landing spot for the data in data cache 210 which may reduce latency when the data is retrieved (relative to waiting to allocate until the data is retrieved).

Evict pending field 360 indicates whether an eviction is pending for the corresponding data in data storage circuitry 260. Note that data storage circuitry 260, as is typical for cache circuitry, may not include enough storage for all register data for all active threads. Therefore, cache control circuitry 240 may evict data based on recency or some other replacement scheme. Entries may also be evicted when a corresponding thread is deactivated or complete, for example.

Lock field 370 indicates whether a register is locked. Control circuitry 240 may refrain from evicting locked entries from data cache 210, e.g., based on compiler hint information, even when it normally would have evicted those entries. U.S. patent application Ser. No. 18/173,500 titled "Cache Control to Preserve Register Data" and filed Feb. 23, 2023 describes example lock techniques that may be used to determine when to set and clear field 370.

Note that the illustrated fields are discussed for purposes of explanation but are not intended to limit the scope of the present disclosure. In other embodiments, additional scoreboard fields may be implemented, illustrated fields may be omitted, or both. Further note that while data cache 210 is dedicated to caching register data in disclosed embodiment, similar techniques may be used for scoreboards for various appropriate types of cached data, e.g., various architecturally-defined values that may or may not be registers.

Figure 4:
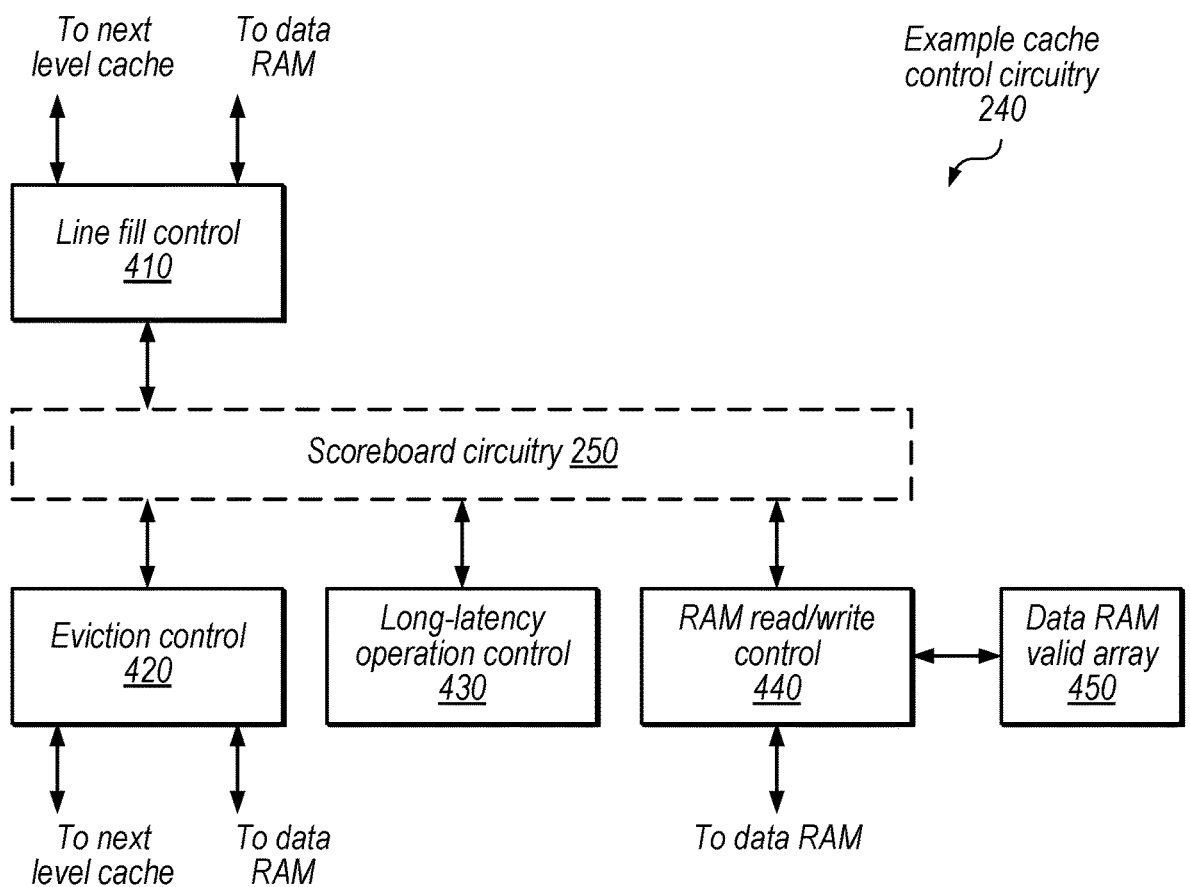
FIG. 4 is a block diagram illustrating example cache control circuitry, according to some embodiments.

FIG. 4 is a block diagram illustrating example cache control circuitry, according to some embodiments. In the illustrated example, cache control circuitry 240 includes line fill control 410, eviction control 420, long-latency operation control 430, RAM read/write control 440, and data RAM valid array 450. Note that scoreboard circuitry 250 is shown using dashed lines to indicate that it is not included in cache control circuitry 240, but the functionality of these circuits may be merged in other embodiments.

Line fill control 410 is configured to retrieve data from a next level cache (e.g., cache 220) and store data in a data RAM (e.g., storage circuitry 260). Eviction control 420 is configured to evict data from the data RAM to the next level cache. Long-latency operation control 430 is configured to track data return for long latency operations and adjust field 340 for the destination register. RAM read/write control 440 is configured to perform reads and writes to the data RAM (e.g., for reads and writes from the datapath).

Data RAM valid array 450 is configured to indicate validity of entries in the data RAM, e.g., based on reads and writes by read/write control 440, eviction control 420, line fill control 410, etc. In tiered multi-level RAM implementations, the scoreboard map state may indicate which level the register is mapped to. This may be advantageous compared to a traditional cache tag, for example, because a single scoreboard replaces the tag in multiple cache levels.

Note that some of the control circuitry shown in FIG. 4 may operate according to well-understood techniques, with adjustments in disclosed embodiment to interface with scoreboard circuitry 250 (e.g., in contrast to traditional cache tag arrays or cache fields). Note that the illustrated circuits are discussed for purposes of explanation but are not intended to limit the scope of the present disclosure. In other embodiments, additional control circuits may be implemented, illustrated control circuits may be omitted, or both.

Example Multi-Stage Scheduling Techniques and Tiered Scoreboard Circuitry

Figure 5:
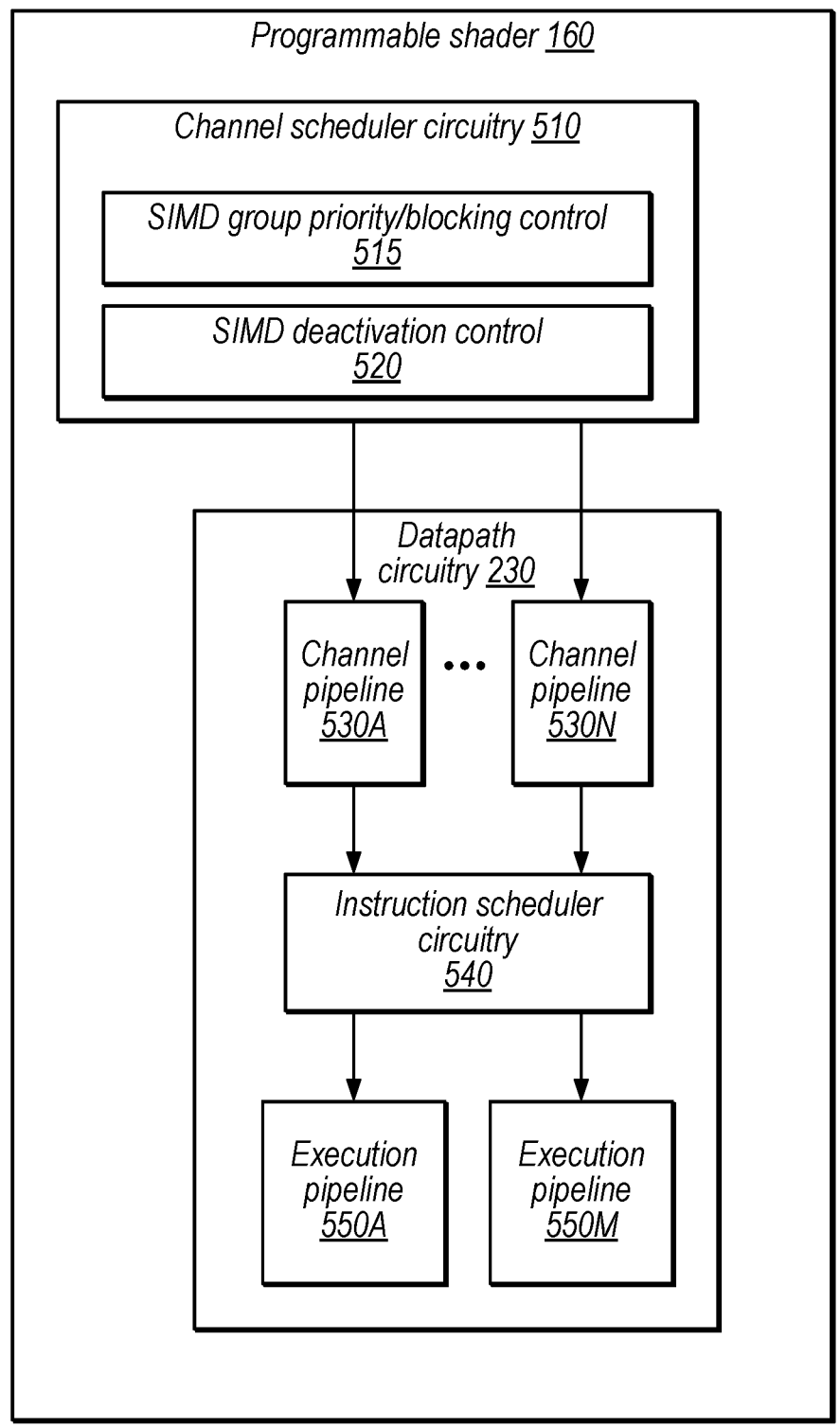
FIG. 5 is a block diagram illustrating example multi-stage scheduling in a GPU with active and inactive SIMD groups, according to some embodiments.

FIG. 5 is a block diagram illustrating example multi-stage scheduling in a GPU with active and inactive SIMD groups, according to some embodiments. Generally, disclosed scoreboard circuitry may include separate circuit structures for active and inactive threads. The multi-stage scheduling of FIG. 5 is one non-limiting example of an architecture in which threads may be switched between active and inactive states. Similar techniques may be used in other embodiments to differentiate among various appropriate types of threads, e.g., with different statues, priorities, classifications, etc.

In the illustrated example, programmable shader 160 includes channel scheduler circuitry 510 configured to assign SIMD groups to channel pipelines 530A-530N and instruction scheduler circuitry 540 configured to assign instructions from SIMD groups that are active in channel pipelines 530 to execution pipelines 550A-550N.

Channel scheduler circuitry 510, in the illustrated embodiment, is configured to arbitrate among SIMD groups that are ready to be assigned to a channel pipeline. Circuitry 510 may also be referred to as a first-stage scheduler or SIMD group scheduler. Note that other embodiments may not implement SIMD techniques and a single thread may be assigned to a given channel. In other embodiments, any appropriate set of one or more threads may be assigned to a given channel. Circuitry 510 may implement an age-based scheduler in which older threads are generally prioritized for assignment to channels. However, this age-based scheme (or any other appropriate default scheme) may be modified in certain scenarios.

SIMD group priority/block control circuitry 515, in the illustrated embodiment, is configured to control SIMD group priority and may block SIMD groups in certain scenarios (e.g., when the SIMD groups have lower priority, are younger, are waiting for resources that are busy (such as a particular execution pipeline), etc.).

SIMD deactivation control 520, in some embodiments, is configured to deactivate a SIMD group from a channel pipeline 530 in certain situations, e.g., when encountering a long-latency operation, when stalled for certain hazards, to make room for a higher-priority SIMD group, etc. Note that deactivated SIMD groups may become eligible for subsequent re-activation to a channel pipeline 530 by channel scheduler circuitry 510, immediately or based on a subsequent event.

Channel pipelines 530, in some embodiments, include various stages such as a decode stage, a hazard stall stage, etc. The decode stage may identify the nature of an instruction, which may specify which type of execution pipeline should handle the instruction (e.g., such as an integer pipeline, floating-point pipeline, accelerator hardware, etc.). Because at least part of instruction decode may occur within a channel pipeline 530, specific instructions included in a thread may not be considered when assigning threads to channels (other than based on compiler hints). A hazard stall stage may stall an instruction until any hazards are resolved. Thus, instructions may not be eligible for arbitration at the instruction scheduler circuitry 540 until any hazards are resolved.

Instruction scheduler circuitry 540, in the illustrated embodiment, is configured to arbitrate among ready instructions from channel pipelines 530 for assignment to execution circuitry. Instruction scheduler circuitry 540 may select multiple instructions for assignment to different execution pipelines in a given cycle.

Execution pipelines 550 may be configured to perform the operation specified by a given instruction and may include various different units, e.g., integer units, sample units, floating-point units, load/store units, etc. Some execution pipelines may be different instantiations of the same type of unit, e.g., multiple integer units. In other embodiments, execution pipelines include at most one of a given type of unit. Generally, at certain times, there may be a greater number of instructions in channel pipelines 530 that target a certain type of execution resource than the number of available execution pipelines of that type. Instruction scheduler circuitry 540 may arbitrate among the channel pipelines 530 in this scenario.

Note that disclosed cache techniques may also be used in single-stage scheduling architectures. Multi-stage examples are discussed herein for purposes of explanation and to provide background for certain improvements in this particular context, but are not intended to limit the scope of the present disclosure. U.S. patent application Ser. No. 18/054,376 titled "Multi-stage Thread Scheduling" is incorporated by reference herein in its entirety. The '376 application discusses various techniques for multi-stage scheduling of threads/SIMD groups that may be utilized in various embodiments discussed herein.

Figure 6:
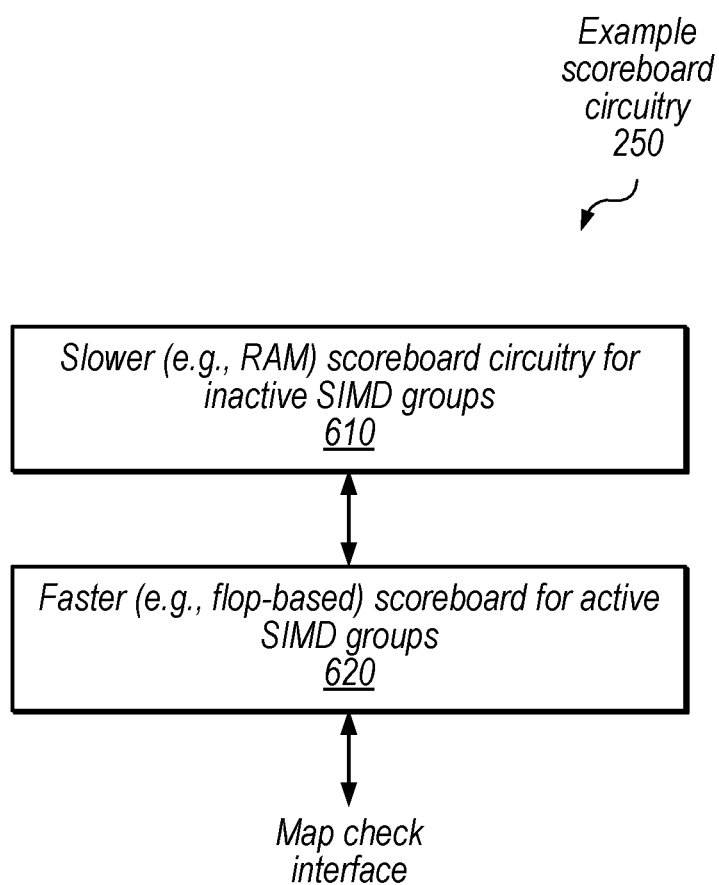
FIG. 6 is a block diagram illustrating example tiered scoreboard circuitry, according to some embodiments.

FIG. 6 is a block diagram illustrating example tiered scoreboard circuitry, according to some embodiments. In the illustrated example, scoreboard circuitry 250 includes slower scoreboard circuitry 610 (e.g., a RAM) for inactive SIMD groups and faster scoreboard circuitry 620 (e.g., flop-based storage) for active SIMD groups. In some embodiments, accesses to circuitry 620 take a smaller number of cycles than accesses to circuitry 610. Circuitry 610 may provide storage for more entries than circuitry 620, however.

In some embodiments, scoreboard circuitry 250 is configured to move entries between circuitry 610 and 620 in response to certain events. For example, circuitry 620 may include storage sufficient for all active SIMD groups in corresponding datapath circuitry 230. Scoreboard circuitry 250 may move entries from circuitry 620 to circuitry 610 when a SIMD group is deactivated and move entries from circuitry 610 to circuitry 620 when an inactive SIMD group is activated. This may advantageously maintain the register map state across SIMD group deactivation and reactivation while providing lower latency, higher bandwidth, or both for scoreboard access to active SIMD groups as well as area-efficient scoreboard storage for inactive SIMD groups.

To reduce the RAM accesses, in some embodiments only entries in circuitry 620 with mapped GPRs or status updates will be written back to circuitry 610 on a deactivation and only the entries in circuitry 610 with GPR mappings will be read out to circuitry 620 on an activation. Therefore, circuitry 610 may store a smaller number of entries for a given SIMD group than circuitry 620. Further, circuitry 610 may include only a proper subset of fields maintained by circuitry 620 for a given entry. For example, circuitry 610 may omit fields that are easily determined or that are relevant only for active threads.

Note that while flop-based and RAM-based storage circuits are discussed herein for purposes of illustration, various appropriate storage topologies may be implemented for different tiers in other embodiments.

Example Detailed Scoreboard with Eviction Candidate Pool

Figure 7:
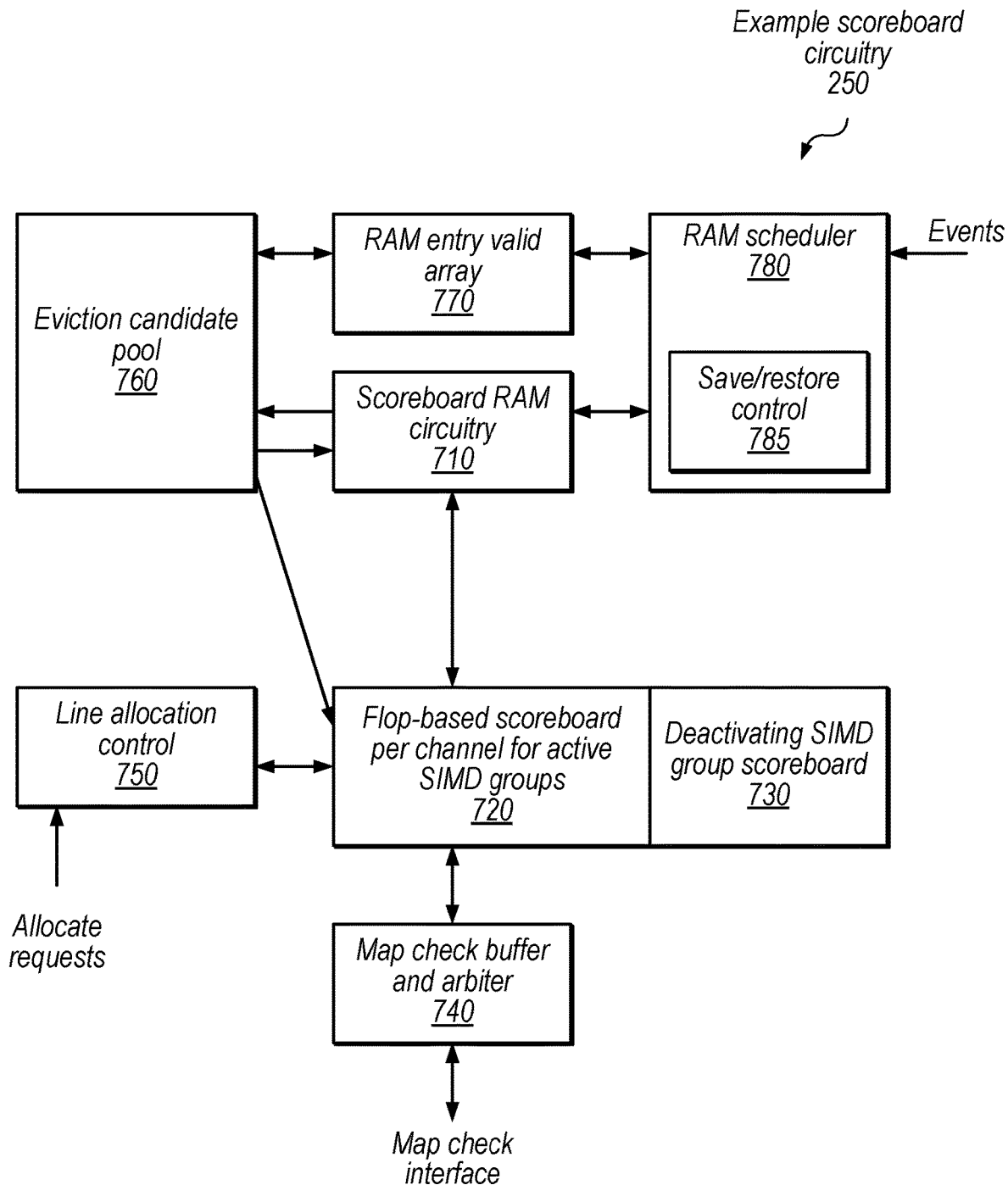
FIG. 7 is a block diagram illustrating a more detailed example scoreboard implementation, according to some embodiments.

FIG. 7 is a block diagram illustrating a more detailed example scoreboard implementation, according to some embodiments. In the illustrated example, scoreboard circuitry 250 includes scoreboard RAM circuitry 710 (one example of circuitry 610), flop-based scoreboard circuitry 720 per channel for active SIMD groups (one example of circuitry 620), deactivating SIMD group scoreboard circuitry 730, map check buffer and arbiter circuitry 740, line allocation control circuitry 750, eviction candidate pool circuitry 760, RAM entry valid array circuitry 770, and RAM scheduler circuitry 780 (which in turn includes save/restore control circuitry 785).

Scoreboard RAM circuitry 710 is configured to maintain scoreboard entries for deactivated threads. Circuitry 710 may implement a map state field, a pointer field (which may point to different levels in a tiered data storage RAM, as discussed below with reference to FIG. 8), a line fill pending field, and a long-latency operation pending field. Circuitry 710 may include multiple banks.

In some embodiments, once the occupancy of RAM circuitry 710 reaches a threshold, control circuitry stalls the channel scheduler circuitry 510 from launching new SIMD groups, e.g., to avoid deadlock scenarios.

Flop-based scoreboard circuitry 720 is configured to maintain scoreboard entries for active threads. There may be a separate scoreboard circuit for each active SIMD group, for example, in circuitry 720 (e.g., corresponding to the number of channel pipelines 530).

Circuitry 720 may include multiple different circuits (e.g., multiple banks). In some embodiments, entries from multiple banks of flop-based circuitry 720 are included in a single storage circuit (e.g., bank) of RAM circuitry 710 and a given SIMD group may therefore have entries stored across multiple banks of RAM circuitry 710. This may advantageously provide performance for accessing data for large SIMD groups, while allowing smaller SIMD groups (e.g., that use a smaller number of registers) to be stored using a smaller number of banks of RAM circuitry 710.

Deactivating SIMD group scoreboard 730 is configured to store scoreboard information during deactivation and may be freed once deactivation is complete. During this window, it may handle lock and initialized status changes (e.g., due to data eviction for the deactivating SIMD group). For example, scoreboard 730 may track fields 320, 340, and 370 of FIG. 3 and write back to scoreboard RAM circuitry 710 once deactivation is complete. This may free up flop-based scoreboard circuitry 720 for the next active SIMD group while the previous SIMD group is deactivating.

Map check buffer and arbiter 740 is configured to arbitrate among map check requests (e.g., from resource manager circuitry associated with datapath circuitry) to scoreboard 720. Cache 210 may support a map check request per datapath channel per cycle, in some embodiments and each map check request may include up to N operands to be checked. Map checks may look up the map state, locked, and long-latency pending fields of a scoreboard entry do determine if the operand should ask for allocation in cache 210. Allocation may not be needed if the register is already mapped, the register is locked, the same register appears as multiple operations in one map check request, for example.

Line allocation control 750 is configured to allocate cache lines in cache 210 in response to allocation requests. In the illustrated example, it receives information indicating replaceable GPRs and invalid cache lines. Control 750 may determine whether to allocate in one of multiple RAM data storage tiers, as discussed below with reference to FIG. 8. It may trigger line fills from a higher-level cache or a larger storage tier in certain situations.

Eviction candidate pool 760 is configured to store information for registers that are eviction candidates. This pool may allow background evictions (which may reduce line fill latency) and may reduce accesses to RAM circuitry 710 for evictions. In some embodiments, pool 760 stores candidates from deactivated threads for potential eviction. Eviction candidates may be first selected from deactivated SIMD groups starting with lowest priority. Eviction candidates may be selected among registers starting with larger GPR index (e.g., based on an assumption that a compiler may use smaller indices more often), random selection, or both.

In some embodiments, background eviction starts with occupancy of cache 210 reaches a threshold level. When a group of eviction candidates are completely evicted (or the corresponding threads are reactivated), pool 760 may write updates back to scoreboard structure 710 or 720.

RAM entry valid array 770 may track whether mappings exist in data storage circuitry 260 for a corresponding entry. In tiered embodiments, a given entry in array 770 may indicate if there is any eviction candidate available within that scoreboard RAM entry for each data storage tier which can be moved into eviction candidate pool 760.

RAM scheduler 780 is configured to issue read and write requests to RAM circuitry 710 based on various input events. Example events may include SIMD group activation (triggering a read from circuitry 710), clique deactivation (triggering a write to circuitry 710), replacement, SIMD group save/restore (e.g., by save restore control circuitry 785 for a context switch, for example), end of SIMD group, etc.

On a context save, save/restore control 785 may read only a portion of the scoreboard information from circuitry 710, 720, or both for a SIMD group being context saved. For example, control circuitry 785 may save information indicating whether a given register is mapped or not, but may not save other information (e.g., pointers, which may not be relevant after a context restore). Control circuitry 785 may write the save data to a higher level in a cache/memory hierarchy. Control circuitry 785 may store mapping information back in circuitry 710, 720, or both on a context restore.

Note that the detailed example of FIG. 7 is included for purposes of illustration but is not intended to limit the scope of the present disclosure. In other embodiments, scoreboard circuitry may include additional circuits, omit one or more illustrated circuits, or both.

Example Tiered Data Cache Storage Circuitry

Figure 8:
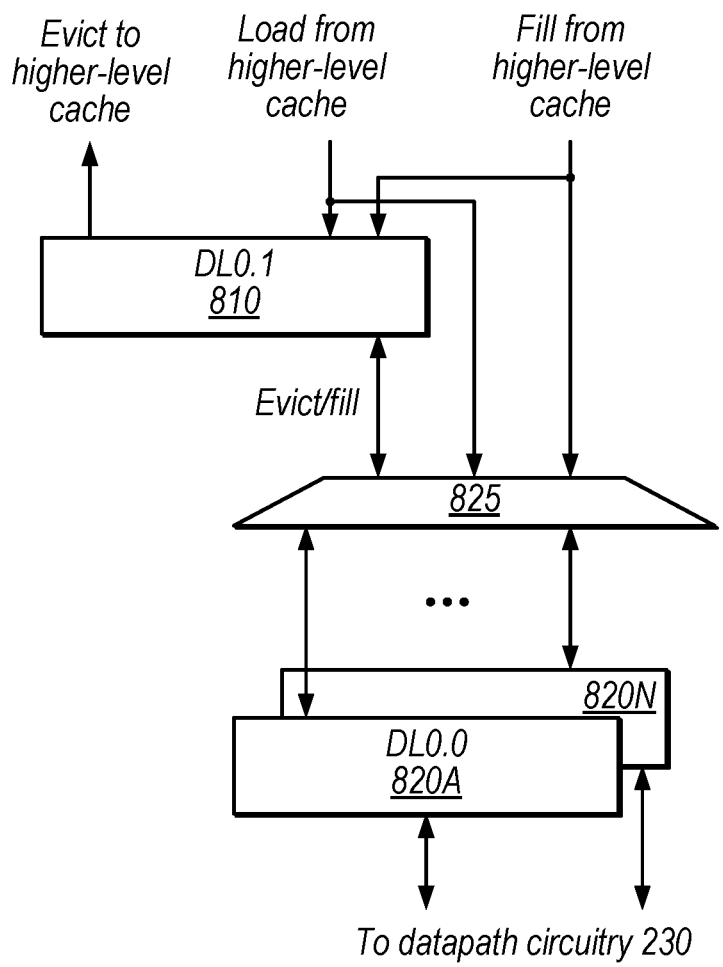
FIG. 8 is a block diagram illustrating detailed example tiered cache storage circuitry, according to some embodiments.

FIG. 8 is a block diagram illustrating detailed example tiered cache storage circuitry, according to some embodiments. In the illustrated example, data storage circuitry 260 includes DL0.1 storage circuitry 810, DL0.0 storage circuitry 820A-820N, and routing circuitry 825.

In some embodiments, storage circuitry 810 has more capacity than circuitry 820, but is slower. Storage circuitry 810 may provide a landing spot for long-latency operations (e.g., detected based on a compiler hint). The datapath, in some embodiments, accesses only storage circuitry 820, however. Therefore, control circuitry (not explicitly shown) may move data between the DL0.0 and DL0.1 storage in certain scenarios. This may advantageously increase the size of the overall data cache 210 while keeping datapath read/write energy low, the area of the DL0.0 storage low, and the DL0.0 storage performance high.

As briefly discussed above, a given scoreboard entry may indicate (e.g., in the map state 310, pointer 330, or both) whether mapped data is in DL0.0 or DL0.1. When there is a hit in DL0.1, control circuitry may fill the data to one or more DL0.0 banks (e.g., circuitry 820) to provide read data to the datapath. Line allocation control 750 may allocate lines in either DL0.0 or DL0.1, e.g., depending on whether the corresponding operation is expected to be a long-latency operation. DL0.1 storage may be multi-ported. In some embodiments, operands for long-latency operations can be allocated in either DL0.0 or DL0.1 but operands for other operations are always allocated in DL0.0.

Figure 9:
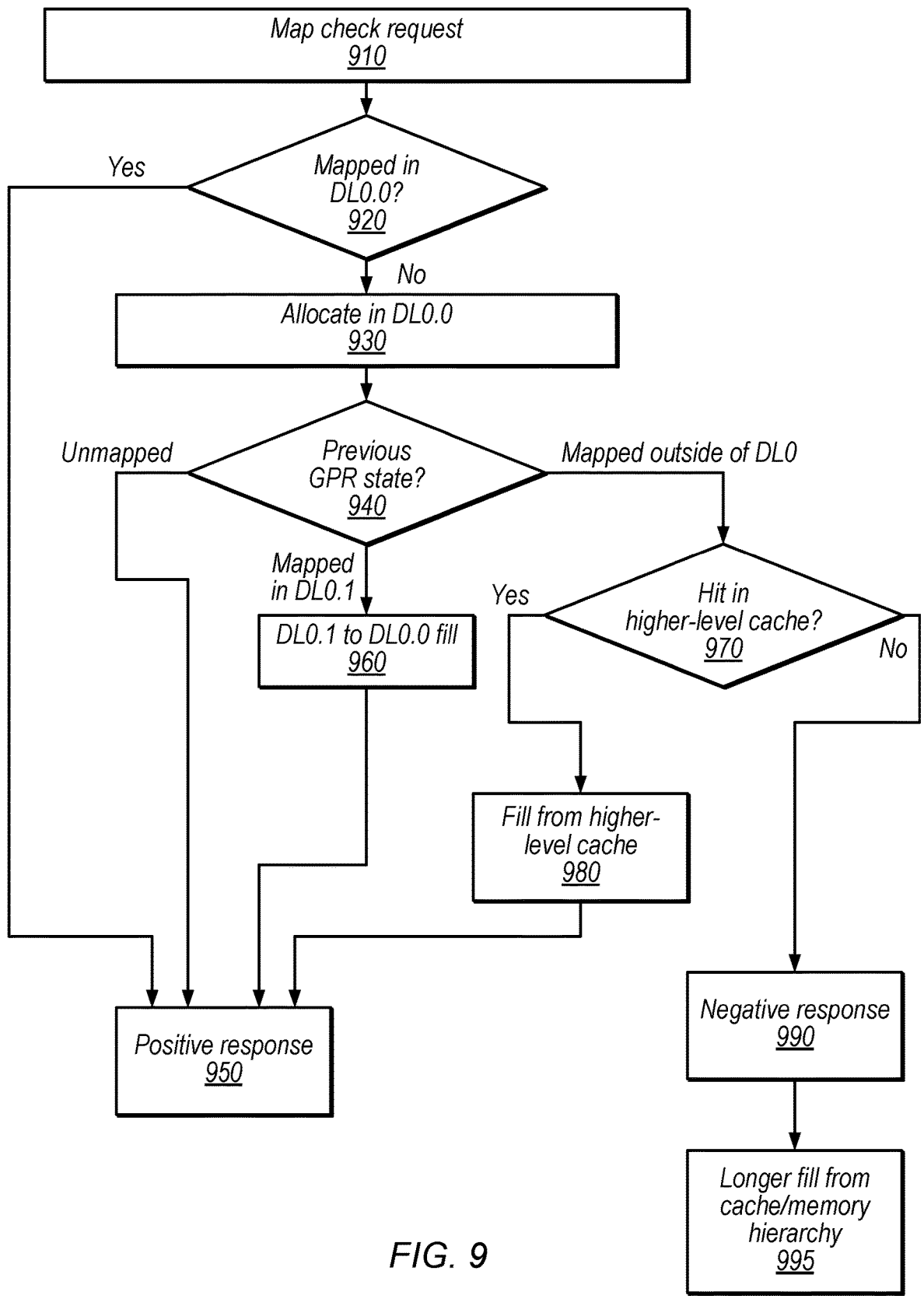
FIG. 9 is a flow diagram illustrating an example map check procedure, according to some embodiments.

FIG. 9 is a flow diagram illustrating an example map check procedure, according to some embodiments. At 910, in the illustrated example, scoreboard circuitry 250 receives a map check request (e.g., at arbiter 740). Control circuitry checks whether the register is mapped in DL0.0 at 920. If so, flow proceeds to 950 and arbiter 740 provides a positive response indicating that the register is mapped in the data cache 210.

If the register is not mapped in DL0.0, flow proceeds to 930 and control circuitry allocates an entry in DL0.0 for the register. At 940, control circuitry checks the previous GPR state for the register. If the register was previously unmapped, arbiter 740 provides a positive response at 950. If the register was mapped in DL0.1, flow proceeds to 960 and control circuitry (e.g., data RAM scheduler 440) fills the register data from DL0.1 to DL 0.0.

If the register was mapped outside of DL0, flow proceeds to 970 where control circuitry determines if there was a hit in a higher-level cache. If so, flow proceeds to 980, the data is filled from the higher-level cache, and flow proceeds to 950. If not, flow proceeds to 990 and arbiter 740 provides a negative map check response, followed by a longer fill from the cache/memory hierarchy at 995. Note that in some situations (misses at 970), control circuitry may deactivate the SIMD group while waiting for the fill data. More generally, control circuitry may deactivate a SIMD group when a register is mapped but the data is stored above a certain level in a cache/memory hierarchy.

Example Method

Figure 10:
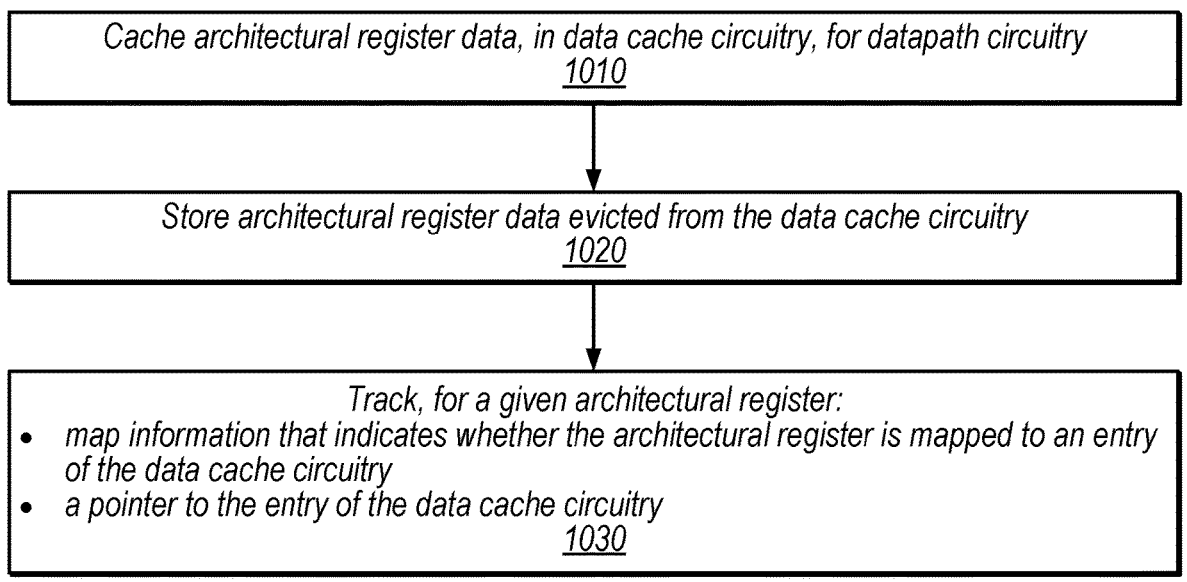
FIG. 10 is a flow diagram illustrating an example method, according to some embodiments.

FIG. 10 is a flow diagram illustrating an example method, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, a processor (e.g., data cache circuitry 210) caches architectural register data for datapath circuitry.

In some embodiments, the data cache includes first-level storage circuitry configured to provide operand data directly to the datapath circuitry and second-level storage circuitry configured to provide fill data to the first-level storage circuitry. The scoreboard circuitry may maintain map state information per register that indicates whether mapped register data exists in the first-level storage circuitry or the second-level storage circuitry. The data cache circuitry may allocate an entry in the second-level storage circuitry for a register based on a compiler hint that indicates a long-latency operation is pending to obtain data for the register.

At 1020, in the illustrated embodiment, the processor stores architectural register data evicted from the data cache circuitry (e.g., in higher-level cache 220). Cache control circuitry may select an entry in the data cache circuitry for eviction based on a priority of a thread corresponding to the entry.

At 1030, in the illustrated embodiment, the processor tracks (e.g., using scoreboard 250), for a given architectural register: map information that indicates whether the architectural register is mapped to an entry of the data cache circuitry and a pointer to the entry of the data cache circuitry.

In some embodiments, the processor determines hits and misses in the data cache circuitry by accessing the scoreboard circuitry using thread identifier information and register identifier information. Therefore, the scoreboard may replace a traditional tag array for the cache.

In some embodiments, the scoreboard circuitry is further configured to track, for a given architectural register: an indication whether a mapped architectural register has valid data in the data cache circuitry, an indication whether an architectural register is locked by the datapath circuitry such that it is not currently allowed to be evicted from the data cache circuitry, an indication whether a long-latency operation is pending for the architectural register, an indication whether a fill data return is pending for the architectural register, and an indication whether an eviction is pending for the architectural register.

In some embodiments, the processor includes: channel pipelines, execution pipelines configured to receive instructions from the channel pipelines, thread scheduling circuitry configured to arbitrate among threads to select threads to activate to a channel pipeline, and instruction scheduling circuitry configured to arbitrate among instructions in channel pipelines to schedule to the execution pipelines. In some embodiments, the scoreboard circuitry includes: first scoreboard circuitry implemented using a first circuit technology (e.g., flops) and configured to store scoreboard information for one or more activated threads and second scoreboard circuitry implemented using a second circuit technology (e.g., a RAM) and configured to store scoreboard information for one or more inactive threads. Control circuitry may copy data from the second scoreboard circuitry to the first scoreboard circuitry in response to a thread activation.

In some embodiments, the first scoreboard circuitry includes multiple banks and the second scoreboard circuitry includes multiple storage instances that each include scoreboard information from multiple banks of the first scoreboard circuitry.

In some embodiments, eviction candidate circuitry stores information from the scoreboard circuitry for one or more deactivated threads and control circuitry evicts data from the data cache circuitry based on information stored in the eviction candidate circuitry. In some embodiments, the control circuitry evicts the data based on occupancy of the data cache circuitry reaching a threshold level. In some embodiments, cache control circuitry selects an entry in the data cache circuitry for eviction according to a policy that prioritizes data from inactive threads for eviction over data from activated threads.

In some embodiments, in response to a processor event, the scoreboard circuitry saves map information for multiple corresponding architectural registers to at least one of the one or more backing caches or memories. The scoreboard circuitry may restore the map information to the scoreboard circuitry in response to a restore event.

As used herein, the term "compute kernel" in the graphics context is intended to be interpreted according to its well-understood meaning, which includes a routine compiled for acceleration hardware such as a graphics processor. Kernels may be specified by a separate program language such as OpenCL C, may be written as compute shaders in a shading language such as OpenGL, or embedded in application code in a high level language, for example. Compute kernels typically include a number of workgroups which in turn include a number of workitems (also referred to as threads).

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

Example Device

Figure 11:
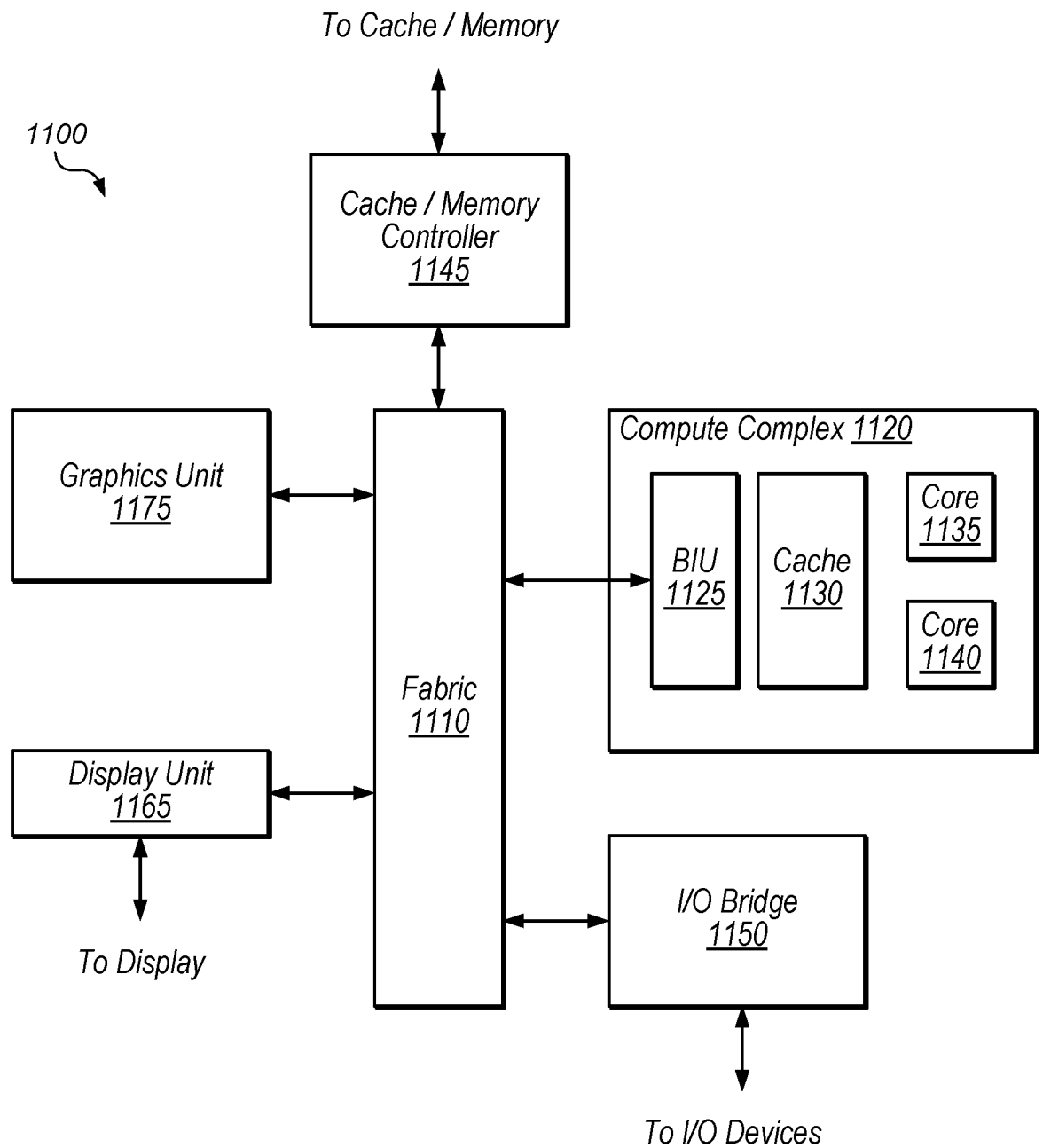
FIG. 11 is a block diagram illustrating an example computing device, according to some embodiments.

Referring now to FIG. 11, a block diagram illustrating an example embodiment of a device 1100 is shown. In some embodiments, elements of device 1100 may be included within a system on a chip. In some embodiments, device 1100 may be included in a mobile device, which may be battery-powered. Therefore, power consumption by device 1100 may be an important design consideration. In the illustrated embodiment, device 1100 includes fabric 1110, compute complex 1120 input/output (I/O) bridge 1150, cache/memory controller 1145, graphics unit 1175, and display unit 1165. In some embodiments, device 1100 may include other components (not shown) in addition to or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally.

In the illustrated embodiment, compute complex 1120 includes bus interface unit (BIU) 1125, cache 1130, and cores 1135 and 1140. In various embodiments, compute complex 1120 may include various numbers of processors, processor cores and caches. For example, compute complex 1120 may include 1, 2, or 4 processor cores, or any other suitable number. In one embodiment, cache 1130 is a set associative L2 cache. In some embodiments, cores 1135 and 1140 may include internal instruction and data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100. Processor cores such as cores 1135 and 1140 may be configured to execute instructions of a particular instruction set architecture (ISA) which may include operating system instructions and user application instructions. These instructions may be stored in computer readable medium such as a memory coupled to memory controller 1145 discussed below.

As used herein, the term "coupled to" may indicate one or more connections between elements, and a coupling may include intervening elements. For example, in FIG. 11, graphics unit 1175 may be described as "coupled to" a memory through fabric 1110 and cache/memory controller 1145. In contrast, in the illustrated embodiment of FIG. 11, graphics unit 1175 is "directly coupled" to fabric 1110 because there are no intervening elements.

Cache/memory controller 1145 may be configured to manage transfer of data between fabric 1110 and one or more caches and memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches. Memory coupled to controller 1145 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1145 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1120 to cause the computing device to perform functionality described herein.

Graphics unit 1175 may include one or more processors, e.g., one or more graphics processing units (GPUs). Graphics unit 1175 may receive graphics-oriented instructions, such as OPENGL®, Metal®, or DIRECT3D® instructions, for example. Graphics unit 1175 may execute specialized GPU instructions or perform other operations based on the received graphics-oriented instructions. Graphics unit 1175 may generally be configured to process large blocks of data in parallel and may build images in a frame buffer for output to a display, which may be included in the device or may be a separate device. Graphics unit 1175 may include transform, lighting, triangle, and rendering engines in one or more graphics processing pipelines. Graphics unit 1175 may output pixel information for display images. Graphics unit 1175, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may improve performance, reduce power consumption, reduce area, or some combination thereof for one or more caches included in graphics unit 1175.

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and low-power always-on functionality, for example. I/O bridge 1150 may also include interfaces such as pulse-width modulation (PWM), general-purpose input/output (GPIO), serial peripheral interface (SPI), and inter-integrated circuit (I2C), for example. Various types of peripherals and devices may be coupled to device 1100 via I/O bridge 1150.

In some embodiments, device 1100 includes network interface circuitry (not explicitly shown), which may be connected to fabric 1110 or I/O bridge 1150. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1100 with connectivity to various types of other devices and networks.

Example Applications

Figure 12:
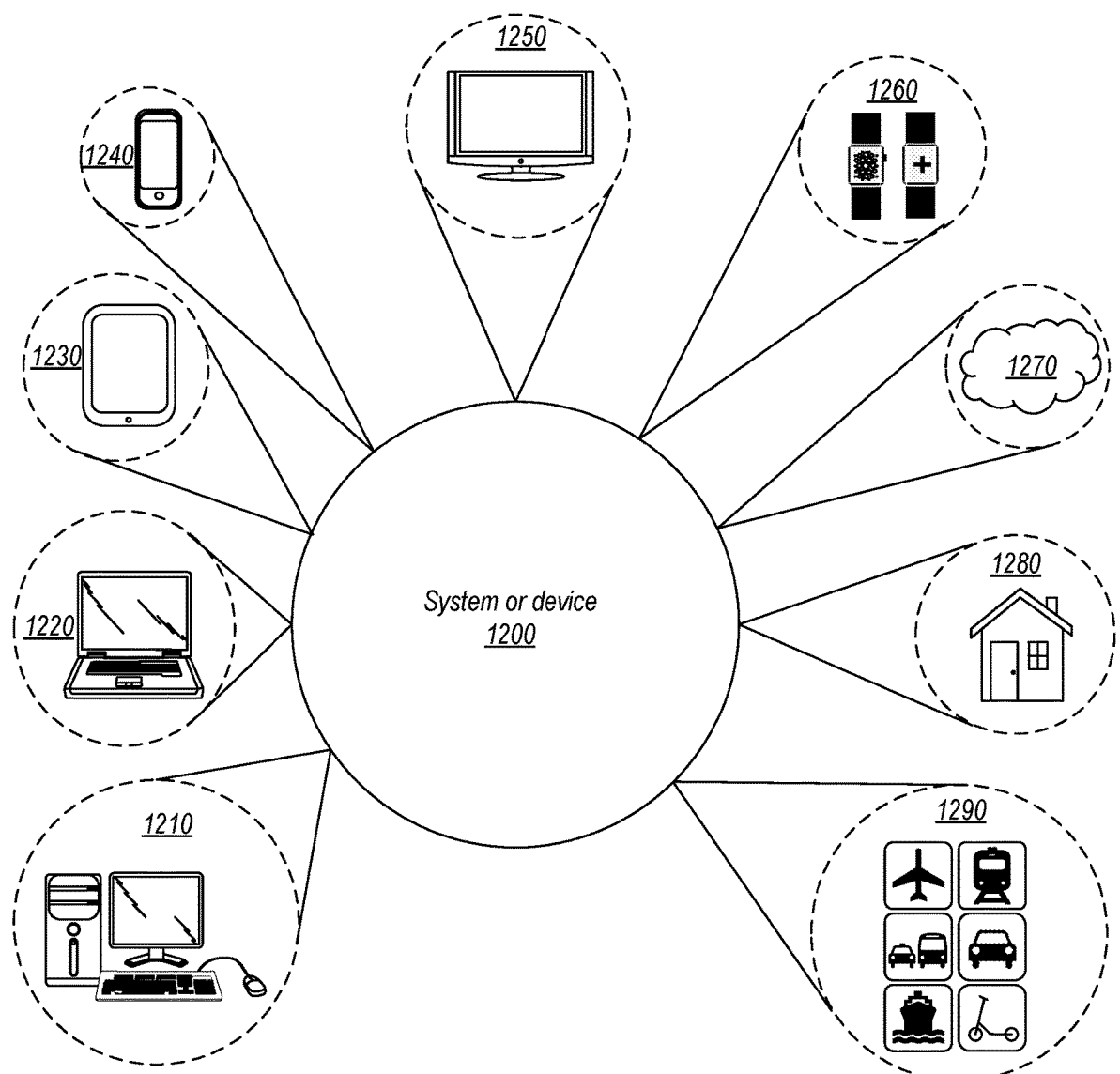
FIG. 12 is a diagram illustrating example applications of disclosed systems and devices, according to some embodiments.

Turning now to FIG. 12, various types of systems that may include any of the circuits, devices, or system discussed above. System or device 1200, which may incorporate or otherwise utilize one or more of the techniques described herein, may be utilized in a wide range of areas. For example, system or device 1200 may be utilized as part of the hardware of systems such as a desktop computer 1210, laptop computer 1220, tablet computer 1230, cellular or mobile phone 1240, or television 1250 (or set-top box coupled to a television).

Similarly, disclosed elements may be utilized in a wearable device 1260, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1200 may also be used in various other contexts. For example, system or device 1200 may be utilized in the context of a server computer system, such as a dedicated server or on shared hardware that implements a cloud-based service 1270. Still further, system or device 1200 may be implemented in a wide range of specialized everyday devices, including devices 1280 commonly found in the home such as refrigerators, thermostats, security cameras, etc. The interconnection of such devices is often referred to as the "Internet of Things" (IoT). Elements may also be implemented in various modes of transportation. For example, system or device 1200 could be employed in the control systems, guidance systems, entertainment systems, etc. of various types of vehicles 1290.

The applications illustrated in FIG. 12 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 13:
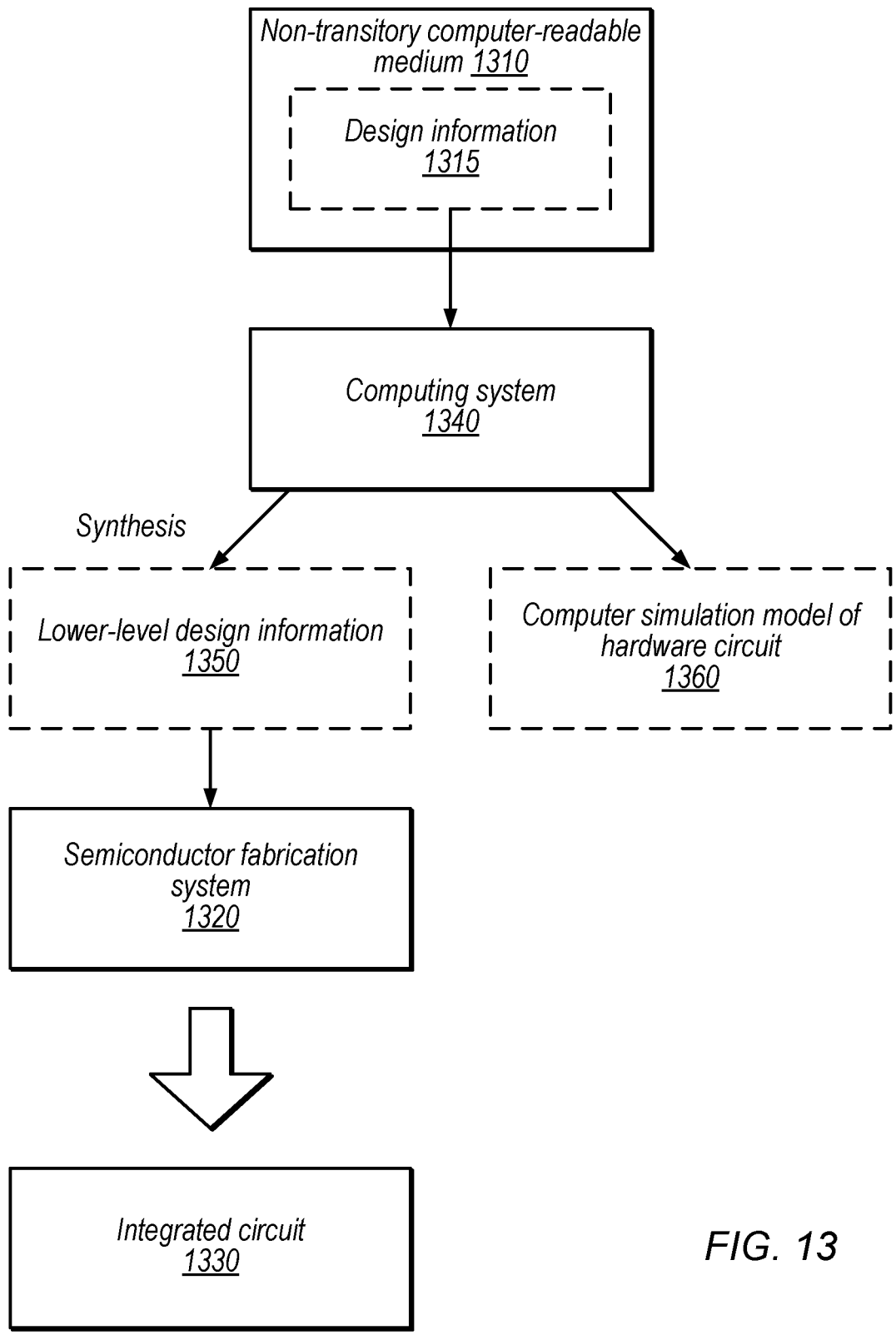
FIG. 13 is a block diagram illustrating an example computer-readable medium that stores circuit design information, according to some embodiments.

FIG. 13 is a block diagram illustrating an example non-transitory computer-readable storage medium that stores circuit design information, according to some embodiments. In the illustrated embodiment, computing system 1340 is configured to process the design information. This may include executing instructions included in the design information, interpreting instructions included in the design information, compiling, transforming, or otherwise updating the design information, etc. Therefore, the design information controls computing system 1340 (e.g., by programming computing system 1340) to perform various operations discussed below, in some embodiments.

In the illustrated example, computing system 1340 processes the design information to generate both a computer simulation model of a hardware circuit 1360 and lower-level design information 1350. In other embodiments, computing system 1340 may generate only one of these outputs, may generate other outputs based on the design information, or both. Regarding the computing simulation, computing system 1340 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1340 also processes the design information to generate lower-level design information 1350 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1350 (potentially among other inputs), semiconductor fabrication system 1320 is configured to fabricate an integrated circuit 1330 (which may correspond to functionality of the simulation model 1360). Note that computing system 1340 may generate different simulation models based on design information at various levels of description, including information 1350, 1315, and so on. The data representing design information 1350 and model 1360 may be stored on medium 1310 or on one or more other media.

In some embodiments, the lower-level design information 1350 controls (e.g., programs) the semiconductor fabrication system 1320 to fabricate the integrated circuit 1330. Thus, when processed by the fabrication system, the design information may program the fabrication system to fabricate a circuit that includes various circuitry disclosed herein.

Non-transitory computer-readable storage medium 1310, may comprise any of various appropriate types of memory devices or storage devices. Non-transitory computer-readable storage medium 1310 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof. Accordingly, non-transitory computer-readable storage medium 1310 may include two or more memory media; such media may reside in different locations—for example, in different computer systems that are connected over a network.

Design information 1315 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1340, semiconductor fabrication system 1320, or both. In some embodiments, design information may also include one or more cell libraries that specify the synthesis, layout, or both of integrated circuit 1330. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1330 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 and model 1360 are configured to operate according to a circuit design specified by design information 1315, which may include performing any of the functionality described herein. For example, integrated circuit 1330 may include any of various elements shown in FIGS. 1B, 2, 4-8, and 11. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1320 to fabricate integrated circuit 1330.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more."Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
datapath circuitry configured to execute instructions that operate on input operands from architectural registers;
data cache circuitry configured to cache architectural register data for the datapath circuitry;
one or more backing caches or memories configured to store architectural register data evicted from the data cache circuitry;
scoreboard circuitry configured to track, for a given architectural register:
map information that indicates whether the architectural register is mapped to an entry of the data cache circuitry; and
a pointer to the entry of the data cache circuitry.

2. The apparatus of claim 1, wherein the apparatus is configured to determine hits and misses in the data cache circuitry by accessing the scoreboard circuitry using thread identifier information and register identifier information.

3. The apparatus of claim 1, wherein the scoreboard circuitry is further configured to track, for a given architectural register:
an indication whether a mapped architectural register has valid data in the data cache circuitry;

an indication whether an architectural register is locked by the datapath circuitry such that it is not currently allowed to be evicted from the data cache circuitry;
an indication whether a long-latency operation is pending for the architectural register;
an indication whether a fill data return is pending for the architectural register; and
an indication whether an eviction is pending for the architectural register.

4. The apparatus of claim 1, wherein:
in response to a processor event, the scoreboard circuitry is configured to save map information for multiple corresponding architectural registers to at least one of the one or more backing caches or memories; and
the scoreboard circuitry is configured to restore the map information to the scoreboard circuitry in response to a restore event.

5. The apparatus of claim 1, further comprising cache control circuitry configured to:
select an entry in the data cache circuitry for eviction based on a priority of a thread corresponding to the entry.

6. The apparatus of claim 1, wherein the data cache circuitry includes:
first-level storage circuitry configured to provide operand data directly to the datapath circuitry; and
second-level storage circuitry configured to provide fill data to the first-level storage circuitry;
wherein the scoreboard circuitry is configured to maintain map state information that indicates whether mapped register data exists in the first-level storage circuitry or the second-level storage circuitry.

7. The apparatus of claim 6, wherein the data cache circuitry is configured to allocate an entry in the second-level storage circuitry for a register based on a compiler hint that indicates a long-latency operation is pending to obtain data for the register.

8. The apparatus of claim 1, further comprising:
channel pipelines;
execution pipelines configured to receive instructions from the channel pipelines;
thread scheduling circuitry configured to arbitrate among threads to select threads to activate to a channel pipeline; and
instruction scheduling circuitry configured to arbitrate among instructions in channel pipelines to schedule to the execution pipelines;
wherein the scoreboard circuitry includes:
first scoreboard circuitry implemented using a first circuit technology and configured to store scoreboard information for one or more activated threads;
second scoreboard circuitry implemented using a second circuit technology and configured to store scoreboard information for one or more inactive threads; and
control circuitry configured to copy data from the second scoreboard circuitry to the first scoreboard circuitry in response to a thread activation.

9. The apparatus of claim 8, wherein the first circuit technology is a flop-based technology and the second circuit technology is a random-access memory.

10. The apparatus of claim 8, further comprising:
eviction candidate circuitry configured to store information from the scoreboard circuitry for one or more deactivated threads; and
control circuitry configured to evict data from the data cache circuitry based on information stored in the eviction candidate circuitry.

11. The apparatus of claim 10, wherein the control circuitry is configured to evict the data based on occupancy of the data cache circuitry reaching a threshold level.

12. The apparatus of claim 8, further comprising cache control circuitry configured to:
select an entry in the data cache circuitry for eviction according to a policy that prioritizes data from inactive threads for eviction over data from activated threads.

13. The apparatus of claim 8, wherein:
the first scoreboard circuitry includes multiple banks; and
the second scoreboard circuitry includes multiple storage instances that each include scoreboard information from multiple banks of the first scoreboard circuitry.

14. The apparatus of claim 1, wherein the apparatus is a computing device that further includes:
a central processing unit;
a display; and
network interface circuitry.

15. The apparatus of claim 1,
wherein the datapath circuitry includes a plurality of single-instruction multiple-data (SIMD) pipelines configured to execute instructions; and
wherein the apparatus includes fixed-function circuitry configured to control the SIMD pipelines to perform operations for at least one of the following types of programs:
graphics shader programs; and
machine learning programs.

16. A method, comprising:
caching, by a computing system in a data cache, architectural register data;
storing, by the computing system, architectural register data evicted from the data cache;
tracking, by the computing system using a scoreboard, for a given architectural register:
map information that indicates whether the architectural register is mapped to an entry of the data cache; and
a pointer to the entry of the data cache.

17. The method of claim 16, wherein the tracking further tracks:
an indication whether the architectural register is locked by a datapath such that it is not currently allowed to be evicted from the data cache; and
an indication whether a long-latency operation is pending for the architectural register.

18. The method of claim 16, further comprising:
saving, by the computing system in response to a processor event, map information for multiple corresponding architectural registers; and
restoring, by the computing system, the saved map information to the scoreboard in response to a restore event.

19. The method of claim 16, further comprising:
selecting an entry in the data cache for eviction based on a priority of a thread corresponding to the entry.

20. A non-transitory computer-readable medium having instructions of a hardware description programming language stored thereon that, when processed by a computing system, program the computing system to generate a computer simulation model, wherein the model represents a hardware circuit that includes:
datapath circuitry configured to execute instructions that operate on input operands from architectural registers;

data cache circuitry configured to cache architectural register data for the datapath circuitry;
one or more backing caches or memories configured to store architectural register data evicted from the data cache circuitry;
scoreboard circuitry configured to track, for a given architectural register:
  map information that indicates whether the architectural register is mapped to an entry of the data cache circuitry; and
  a pointer to the entry of the data cache circuitry.

* * * * *